United States Patent Office 3,426,668
Patented Feb. 11, 1969

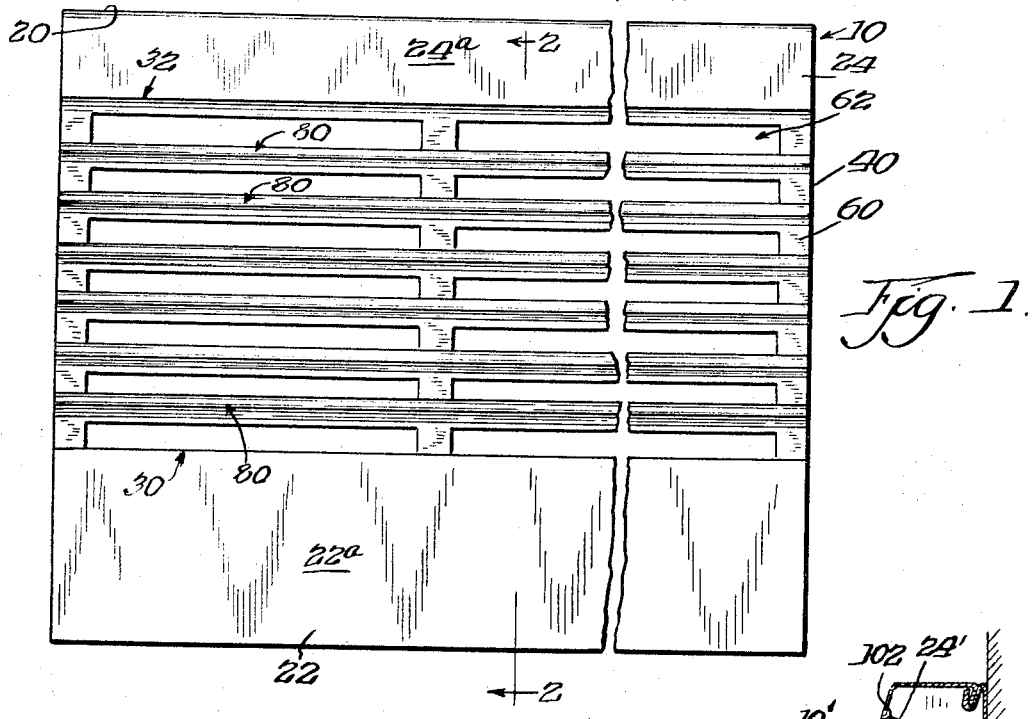
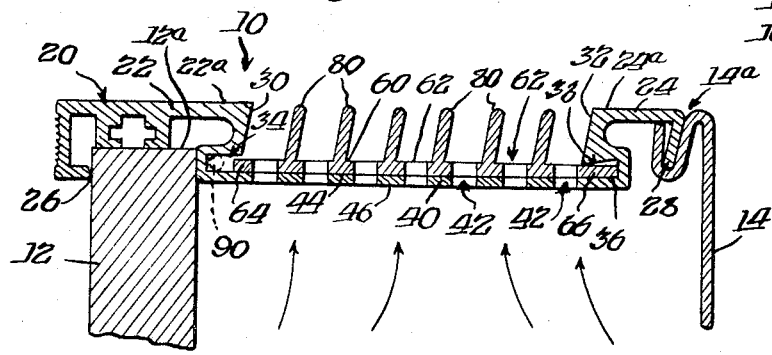
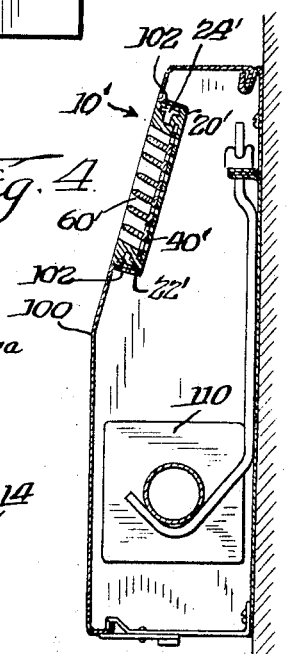

3,426,668
LOUVERED VALVE
Maurice H. Hofmeister, Park Ridge, and Joseph W. Komperda, Gurnee, Ill., assignors to Hofmeister Co., Park Ridge, Ill., a corporation of Illinois
Filed Apr. 12, 1967, Ser. No. 630,449
U.S. Cl. 98—41                                    4 Claims
Int. Cl. F24f 13/06, 13/08

ABSTRACT OF THE DISCLOSURE

This invention generally relates to a valve assembly for regulating the flow in a fluid system. More particularly, this invention relates to a valve assembly especially adapted for controlling the air flow in convection or forced-air circulating systems. The valve assembly in accordance with this invention includes a valve body and louvered valve means which selectively co-operate to regulate the volume and direction of fluid flow through the valve assembly.

Summary of the invention

Industries dealing with the regulation and control of fluid flow have been striving constantly to design improved valve assemblies which would greatly simplify the control of both the volume and direction of flow in various fluid systems. The need for such assemblies has been particularly prevalent in the industries dealing with the regulation and control of air flow in forced-air and air convection systems, such as in industrial and domestic air conditioning, heating or refrigerating systems and the like.

In many air flow systems the valve assemblies presently employed are quite cumbersome, expensive and complicated. Moreover, such prior valve assemblies usually include means for regulating the volume of fluid flow which are separate from the means used to control the direction of flow. As a result, these prior fluid systems often needed duplicate flow control equipment.

Therefore, the principal object of this invention is to provide a louvered valve assembly which is economical to manufacture on a mass-production basis, and which operates simply and efficiently to regulate both the direction and volume of flow in fluid systems. Among other advantages, the valve assembly embodying the features of this invention eliminates the need for duplicate equipment for completely controlling fluid flow.

Briefly described, the valve assembly in accordance with this invention includes a valve body having a flow control portion which may be positioned within the path of flow of the fluid being regulated. The flow control portion of the valve body is apertured in a pre-arranged pattern so that the fluid may flow through the valve body when the valve assembly is in an open position.

The valve assembly in accordance with this invention further includes a valve member positioned adjacent the flow control portion of the valve body. The valve member is also apertured in a pre-arranged pattern, and is capable of sliding or translating movement with respect to the flow control portion of the valve body. In accordance with this invention the apertures in the slidable valve member are selectively alignable with the apertures in the flow control portion of the valve body to define continuous ports for directing fluid such as air through the valve assembly.

In addition, the slidable valve member of the present invention can be selectively moved with respect to the valve body to partially or completely disalign the corresponding apertures in the valve member and in the flow control portion of the valve body. The valve member and the valve body therefore co-operate to regulate the volume of fluid flowing through the valve assembly, and permit the volume of flow to be gradiently changed between a maximum flow, or "open" condition and a zero flow or "closed" condition. Means are also provided to movably retain the valve member and valve body in the desired relative position between the maximum and minimum conditions. Moreover, the valve assembly can be readily adapted to control the volume of fluid flow between various maximum and minimum flow conditions.

The valve assembly in accordance with this invention further includes means which control the direction of flow of fluid through the valve assembly. In this regard, the valve member is provided with air-deflecting vanes or louvers which are arranged to guide or deflect the fluid flow in a predetermined path. These louvers are positioned on the slidable valve member in a manner which assures that any fluid flowing through the valve assembly necessarily will be deflected in the desired direction. Accordingly, the valve assembly of the present invention simultaneously controls both the volume and direction of fluid flow without complication duplicate equipment.

Additional objects and features of this invention will be more fully understood by reference to the following description of a specific valve assembly embodiment, taken in conjunction with the accompanying drawings, in which:

FIGURE 1 is a plan view of a valve assembly embodying the features of the present invention, shown in a maximum "open" condition;

FIGURE 2 is a cross-sectional view of the valve assembly taken along the line 2—2 in FIGURE 1;

FIGURE 3 is a cross-sectional view of the valve assembly similar to FIGURE 2, with the valve assembly shown in a minimum "closed" condition, and FIGURE 4 is a cross-sectional view of a conventional air-heating unit provided with the valve assembly in accordance with the preesnt invention.

Referring generally to the drawing, the valve assembly embodying the features of the present invention is indicated generally by the reference numeral 10. The assembly 10 comprises a valve body 20, including a flow control portion 40, and a movable valve member 60. The valve member 60 is slidably nested wtih the valve body 20 adjacent the flow control portion 40, and is capable of sliding or translating movement with respect to the valve body 20. In FIGURE 2 the valve assembly 10 is shown as mounted along the top of a radiator cabinet defined by the walls 12 and 14, and in FIGURE 4 the assembly 10' is shown as mounted in an upper wall of a radiator cabinet 100.

The valve body flow control portion 40 includes a plurality of apertures 42 arranged in a pre-determined pattern. The valve member 60 likewise includes a plurality of apertures 62 which are arranged in a pre-determined pattern. In accordance with the present invention, the translation of the valve member 60 with respect to the valve body 20 regulates the relative positioning or alignment of the apertures 42 and 62, and thereby controls the volume fluid-flow through the valve assembly 10. Further, the valve member 60 includes a plurality of air deflectors or louvers 80 which are positioned closely adjacent the apertures 62 on the valve member. The louvers 80 deflect any fluid passing through the apertures 62 and thus control the direction of fluid-flow through the valve assembly 10.

Referring to the drawing in more detail, the valve body 20 is preferably made from a sturdy metal such as extruded aluminum, and is generally flat and rectangular. In the preferred form the valve body 20 is substantially elongated, and the entire valve assembly 10 is up to several feet in length. As seen in FIGURES 2 and 3, the valve body 20 includes side portions 22 and 24 having upper surfaces 22a and 24a. The surfaces 22a and 24a are in substantial alignment with each other so that the top of the valve body 10, defined by the side portions 22 and 24, is a substantially flat plane surface.

The side portions 22 and 24 of the valve body 20 are provided with suitable means to mount the valve assembly 10 at the desired location within the path of flow of the fluid being controlled. In this regard, the side portion 22 illustrated in FIGURE 2 defines groove 26 which will receive the top edge 12a of the cabinet wall 12. The other side portion 24, as shown in FIGURE 2, includes a depending hook 28 which seats within a groove 14a provided along the top of the cabinet wall 14. In the valve assembly 10' shown in FIGURE 4, the side portions 22' and 24' are adapted to receive suitable fasteners 102, such as metal screws or the like, for securing the valve body 20 to the heating cabinet 100.

As best seen in FIGURES 2 and 3, the center of the valve body 20 between the side portions 22 and 24 is recessed to define the flow control portion 40 of the valve body 20. The flow control portion 40 is preferably flat and enlongate so as to define a flat upper surface 44 and a flat lower surface 46. The flow control portion 40 is designed to be positioned across the path of flow of the fluid being regulated, such as across the flow path indicated by the arrows in FIGURE 2, with the lower surface 46 in direct communication with the fluid.

The flow control portion 40 in accordance with this invention is provided with a plurality of apertures 42 uniformly spaced transversely across the portion 40, in a pre-determined pattern. As shown in FIGURE 1, the apertures 42 are preferably all of substantially the same width and length, are rectangular in configuration, and preferably extend for a substantial longitudinal distance along the valve body 20. The apertures 42 thereby define a plurality of openings which will permit fluid to flow through the valve body 20 during the operation of the valve assembly 10.

The recessed flow control portion 40 also defines inner edges 30 and 32 along the sides 22 and 24, respectively, of the valve body 20. As seen in FIGURES 2 and 3, the edges 30 and 32 are inclined with respect to the surfaces 44 and 46 at an angle corresponding to the angle of inclination of the louvers 80. The edges 30 and 32 thereby assist the louvers 80 in controlling the direction of flow of the fluid flowing through the valve body 10. Moreover, the edges 30 and 32 include longitudinal grooves 34 and 36, respectively, which are designed to receive the valve member 60 and secure the valve member in a nested position directly above the flow control portion 40.

The valve member 60 in accordance with this invention is also preferably flat and elongate so as to nest within the valve body 10 in sliding contact with the upper surface 44 of the valve body flow control portion 40. As shown in FIGURES 2 and 3, the width of the valve member 60 is less than the transverse distance between the bottoms of the valve body grooves 34 and 36. This lesser width of member 60 is selected so that side edges 64 and 66 of the member 60 remain within the respective valve body grooves 34 and 36, and so that the valve member 60 is capable of sliding transversely for a pre-determined distance in either direction within the grooves 34 and 36. The distance through which the member 60 is capable of translating with respect to the valve body 20, which defines the maximum "open" and minimum "closed" conditions for the valve assembly 10, is controlled by selecting a desired depth for the grooves 34 and 36 and a desired width for the valve member side edges 64 and 66.

To movably retain the valve member 60 in any position between the maximum and minimum conditions, the side portion 24 of the valve body 20 includes a projecting abutment shoulder 38, adjacent the mouth of the groove 36. As shown in FIGURES 2 and 3, the shoulder 38 frictionally engages the edge 66 of the valve member 60, and frictionally resists the movement of the valve member 60 with respect to the valve body 20. The abutment shoulder 38 and edge 66 thus co-operate to movably retain the sliding valve member 60 in its desired operating position.

The apertures 62 in the sliding valve member 60 are preferably dimensioned and spaced to correspond to the apertures 42 in the valve body flow control portion 40. Thus, as shown in the drawing, the apertures 62 are elongate and substantially rectangular in configuration, are uniformly spaced across the valve member 60, and extend for a substantial longitudinal distance along the length of the valve member 60. Transverse braces 68 may be extended across the apertures 62 to reinforce the valve member 60.

By such an arrangement, the apertures 62 and 42 can be aligned as shown in FIGURE 2 to provide a plurality of continuous ports which permit fluid to flow through the valve assembly 10. Moreover, the apertures 62 and 42 can be completely disaligned, as shown in FIGURE 3, to block the flow of any fluid through the valve assembly 10. Alignment of the apertures 62 and 42 in the above maximum and minimum-flow positions, or in any position therebetween, is achieved by manually or automatically sliding the valve member 60 transversely with respect to the valve body flow control portion 40. The relative positioning of the valve member 60 and the valve body flow control portion 40 thereby controls the volume of flow of fluid through the valve assembly 10.

The louvers 80 are preferably integral with the valve member 60, and are mounted on the valve member closely adjacent the apertures 62. As best seen in FIGURE 1, the louvers 80 are elongate so as to extend along substantially the whole length of the sliding valve member 60, and are also inclined with respect to the valve member 60. The angle of the louvers 80 is predetermined to correspond to the inclination of the inner edges 30 and 32 on the valve body 20. Accordingly, the louvers 80 and the valve body inner edges 30 and 32 co-operate to control the direction of flow of any fluid passing through the apertures 62 in the valve member 60. The height of the inclined louvers 80 is selected so that the louvers extend upwardly to the plane of the surfaces 22a and 24a on valve body 20. As seen in FIGURES 2 and 3, the valve assembly 10 is thereby provided with a substantially flat top portion which is free from unsightly and potentially dangerous projections.

In operation, the valve assembly 10 is manually or automatically (through mechanical linkage, actuated by electrical, electronic or pneumatic controls) adjusted to control the flow of a fluid stream, such as in an air heating or air conditioning system, by translating the sliding valve member 60 with respect to the valve body 20. In this regard, manual operation of the valve member 60 can be readily achieved by grasping the integral louvers 80 and sliding the valve member 60 and the louvers 80 in the desired direction. As shown in FIGURE 2, when the valve member 60 is translated into one extreme position (rightward in FIG. 2) the apertures 62 are accurately aligned with the apertures 42 on the valve body flow control portion 40. In such condition, the valve member 60 and valve body 20 define continuous openings or ports which permit fluid such as air to flow through the valve assembly 10. Moreover, since the apertures 42 and 62 are in direct alignment, the volume of fluid-flow through the valve assembly 10 will be maximum when the assembly is arranged as shown in FIGURE 2. Such direct alignment of the apertures 62 and 42 is assured by dimensioning the width of edge 66 of the valve member 60 and the depth of the groove 36 in the valve body 20 so that the edge 66 bottoms in the groove 36 when the apertures 62 and 42 are aligned.

Similarly, the valve member 60 may be translated into a second extreme position (leftward in FIG. 3) to completely disalign the apertures 42 and 62, and thereby block the flow of any fluid through the valve assembly 10. As shown in FIGURE 3, in this second extreme position the segments of valve member 60 between the apertures 62 completely close the valve body apertures 42. Again, such condition is assured by dimensioning the edge 64 of the valve member 60 and the groove 34 in the valve body 20 so that the edge 64 bottoms in groove 34 when the apertures 62 and 42 are disaligned. The frictional engagement between the shoulder 38 and the valve member edge 66, as shown in FIGURES 2 and 3, operates to retain the valve member 60 in any desired position between the two above-described extreme positions.

In addition, the valve assembly 10 in accordance with this invention readily permits the extreme positions of the valve members 60 to be varied to meet the needs of a particular situation. In this regard, the grooves 34 and 36 are adapted to receive a stop member such as wire rod 90, as shown in phantom lines in FIGURES 2 and 3. The rod 90 has a predetermined width, and preferably extends along a substantial length of the valve body 20.

With the rod 90 in place within groove 34, as shown in FIGURE 2, the rod 90 is engaged by the valve member edge 64 as the valve member 60 is translated leftward toward a "closed" position. The rod 90 thereby functions as stop means, and prevents the apertures 42 and 62 from moving into the completely disaligned position shown in FIGURE 3. By such an arrangement, the minimum (leftward) positioning of the valve member 60 is varied so that the valve assembly 10 cannot be completely closed. The valve assembly 10 having the rod 90 within the groove 34 is therefore useful in fluid systems where a complete shut-down of fluid-flow is undesirable, such as in air-conditioning systems where there is a danger of freeze-up if the entire system is closed.

As shown in FIGURE 3, the rod 90 may also be extended within the groove 36 of the valve body 20. The rod 90 would then engage the edge 66 of the valve member 60 and would limit the extreme rightward movement of the valve member 60. With such an arrangement, complete alignment of the apertures 42 and 62 would be prevented, and the maximum volume of fluid-flow through the valve assembly 10 would be limited.

As seen from the drawings, the louvers 80, incorporated on the sliding valve member 60, are always in position to deflect the fluid stream passing through the apertures 42 and 62 regardless of the position of the valve member 60 with respect to the valve body 20. Accordingly, the louvers 80 function to control the direction of fluid-flow throughout the entire range of operation of the valve assembly 10.

In FIGURE 4, a valve assembly 10' embodying the above-described features of the present invention, is shown in place in a standard conventional air-heating system. The heating system comprises a wall-mounted heating element 110 positioned within a conventional heating cabinet 100. The valve assembly 10' is mounted in an upper wall of the cabinet 100, in the path of flow of the air being heated by the element 110. The valve assembly 10' controls the volume and direction of the heating air flowing from the cabinet 100 in the manner described above.

Although the invention has been described above with a certain degree of particularity, it should be understood that the present disclosure has been made only by way of example. Consequently, numerous changes in the details of construction and the combination and arrangement of components, as well as the possible modes of utilization, will be apparent to those familiar with the art, and may be resorted to without departing from the spirit and scope of the invention as claimed.

What is claimed is:

1. A louvered valve assembly for controlling gas flow comprising, in combination,
   an elongate valve body having longitudinally extending side portions including means for mounting said body in the path of the gas being controlled, said side portions defining a pair of aligned top surfaces and a pair of opposed and downwardly depending inner side surfaces for said valve body,
   an elongate flow control portion defined by the central portion of said valve body and recessed below said top surfaces between said depending inner side surfaces,
   said valve body further defining a pair of longitudinally extending and transversely opposed grooves positioned in said depending inner side surfaces of said valve body, said opposed grooves including bottom surfaces spaced apart a pre-determined transverse distance on said valve body,
   an elongate sliding valve member nested between said depending inner side surfaces of said valve body above said recessed flow control portion, said valve member including transversely spaced side edges adapted for extension within the adjacent elongate groove in said inner side surfaces of said valve body,
   said side edges on said sliding valve member being transversely spaced by a distance less than the transverse distance between the bottoms of said grooves on said valve body so that said valve member can slide transversely with respect to said flow control portion with the side edges thereof slidably engaging within the adjacent groove,
   a first pattern of apertures provided in said recessed flow control portion of said valve body,
   a second pattern of apertures provided in said sliding valve member and corresponding to said first pattern of apertures,
   said first and second patterns of apertures being arranged on said flow control portion and said valve member, respectively, so that said aperture patterns are in alignment as one of said side edges on said valve member is engaged with the bottom surface of one of said grooves in said valve body,
   to thereby define the maximum flow condition for said valve assembly, said aperture patterns being further arranged so that the apertures are non-aligned as the valve member is translated to bring the other side edge of said member into engagement with the bottom surface of the other of said grooves, to thereby define the minimum flow conditions for said valve assembly,
   abutment means provided on said valve body and adapted to frictionally engage said sliding valve member and thereby movably maintain said valve member in a selected position with respect to said flow control portion of said valve body, and
   louver means joined to said sliding valve member closely adjacent each of the apertures comprising said second aperture pattern on said valve member, each of said louver means being inclined with respect to the direction of said apertures comprising said first and second aperture patterns, each of said louver means further extending upwardly from said sliding valve member toward the plane of said aligned top surfaces of said valve body.

2. A valve assembly in accordance with claim 1 wherein said depending inner side surfaces of said valve body, defining said recessed flow control portion therebetween, are inclined with respect to said top surfaces of said valve body so as to be substantially parallel to said inclined louver means provided on said sliding valve member.

3. A valve assembly in accordance with claim 1 wherein said one groove in said valve body includes a stop means engageable with the adjacent side edge of said valve member to limit the translation of said member so as to preclude the complete alignment of said first and second aperture patterns, to thereby reduce the maximum flow of gas through said valve assembly.

4. A valve assembly in accordance with claim 1 wherein said other groove in said valve body includes a stop means engageable with the adjacent side edge of said sliding valve member to limit the translation of said member with respect to said valve body so as to preclude the complete non-alignment of said first and second aperture patterns, to thereby limit the minimum flow of gas through stid valve assembly.

References Cited

UNITED STATES PATENTS

| | | | |
|---|---|---|---|
| 1,806,530 | 5/1931 | Giesler | 137—625.31 X |
| 2,251,682 | 8/1941 | Ledbetter | 98—41 X |
| 2,807,992 | 10/1957 | Ehman | 98—40 |
| 2,814,242 | 11/1957 | Marini et al. | 98—40 |
| 2,858,077 | 10/1958 | Smith | 98—40 |
| 3,045,578 | 7/1962 | McGrath | 98—40 |
| 3,198,246 | 8/1965 | Brown et al. | 98—40 X |

ROBERT A. O'LEARY, *Primary Examiner.*

W. E. WAYNER, *Assistant Examiner.*

U.S. Cl. X.R.

98—121; 137—625.33; 251—89, 113